US012784986B2

(12) United States Patent
Nishibayashi et al.

(10) Patent No.: US 12,784,986 B2
(45) Date of Patent: Nov. 3, 2026

(54) MULTILAYER CERAMIC CAPACITOR

(71) Applicant: Murata Manufacturing Co., Ltd., Nagaokakyo (JP)

(72) Inventors: Kazuhiro Nishibayashi, Nagaokakyo (JP); Yuko Kawasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 292 days.

(21) Appl. No.: 18/621,196

(22) Filed: Mar. 29, 2024

(65) Prior Publication Data

US 2024/0242887 A1 Jul. 18, 2024

Related U.S. Application Data

(63) Continuation of application No. PCT/JP2023/010659, filed on Mar. 17, 2023.

(30) Foreign Application Priority Data

May 20, 2022 (JP) ................................ 2022-083389

(51) Int. Cl.
*H01G 4/248* (2006.01)
*H01G 4/12* (2006.01)
*H01G 4/30* (2006.01)

(52) U.S. Cl.
CPC ............... *H01G 4/248* (2013.01); *H01G 4/30* (2013.01); *H01G 4/12* (2013.01)

(58) Field of Classification Search
CPC ...... H01G 4/012; H01G 4/1227; H01G 4/248; H01G 4/30; H01G 4/38; H01G 4/008; H01G 4/12
See application file for complete search history.

(56) References Cited

U.S. PATENT DOCUMENTS

2006/0214263 A1* 9/2006 Kojima .................... H01G 4/30 257/532
2011/0110014 A1* 5/2011 Hirata .................... H01G 4/005 156/89.12

(Continued)

FOREIGN PATENT DOCUMENTS

JP H0955335 A 2/1997
JP 2004363285 A 12/2004

(Continued)

OTHER PUBLICATIONS

International Search Report in PCT/JP2023/010659, mailed May 23, 2023, 3 pages.

(Continued)

*Primary Examiner* — Michael P Mcfadden
(74) *Attorney, Agent, or Firm* — Keating & Bennett, LLP

(57) ABSTRACT

When a multilayer ceramic capacitor is viewed as a section of a central portion in a width direction cut parallel or substantially parallel or substantially parallel or substantially parallel to a side surface, in an internal electrode layer in a central portion in a lamination direction and including an extremity spaced apart from an end surface, any one of five segments of the internal electrode layer that are horizontally and successively positioned from the extremity has a length greater than about 0.2 times of an average length of ten segments of the internal electrode layer that are horizontally and successively positioned in a central portion in a length direction.

18 Claims, 7 Drawing Sheets

(56) References Cited

U.S. PATENT DOCUMENTS

| | | | | |
|---|---|---|---|---|
| 2013/0002388 | A1* | 1/2013 | Kim | H01G 4/30 336/200 |
| 2013/0250476 | A1* | 9/2013 | Chung | H01G 4/232 156/89.16 |
| 2016/0196917 | A1* | 7/2016 | Lim | H01G 4/012 361/301.4 |
| 2021/0104364 | A1* | 4/2021 | Okuda | H01G 4/1218 |
| 2022/0165496 | A1* | 5/2022 | Nishikori | H01G 4/30 |
| 2023/0115608 | A1* | 4/2023 | Sugita | H01G 4/224 361/301.4 |

FOREIGN PATENT DOCUMENTS

| | | | |
|---|---|---|---|
| JP | 2008016706 | A | 1/2008 |
| JP | 2011023707 | A | 2/2011 |

OTHER PUBLICATIONS

Written Opinion in PCT/JP2023/010659, mailed May 23, 2023, 4 pages.

* cited by examiner

MULTILAYER CERAMIC CAPACITOR

CROSS REFERENCE TO RELATED APPLICATIONS

This application claims the benefit of priority to Japanese Patent Application No. 2022-083389 filed on May 20, 2022 and is a Continuation Application of PCT Application No. PCT/JP2023/010659 filed on Mar. 17, 2023. The entire contents of each application are hereby incorporated herein by reference.

BACKGROUND OF THE INVENTION

1. Field of the Invention

The present invention relates to multilayer ceramic capacitors.

2. Description of the Related Art

Multilayer ceramic capacitors are widely used in digital circuits installed in digital household appliances, computers, in-vehicle electronic devices, etc. Particularly in recent years, it has become necessary for electronic circuit lines of such devices, especially those of mobile devices, to have a low impedance. There is an increasing need for multilayer ceramic capacitors that have a large capacitance and a reduced residual inductance.

A multilayer ceramic capacitor includes, as a main portion to store electric charge, an inner layer portion including a plurality of dielectric layers and a plurality of internal electrode layers laminated alternately with each other. In order to achieve a large capacitance and a reduction in residual inductance, it is effective to make the internal electrode layers and the dielectric layers thin and to increase the number of internal electrode layers.

However, making the dielectric layers thin results in a relatively high electric field strength being applied per layer. Making the internal electrode layers thin renders it difficult to form the internal electrode layer into a continuous uniform layer in the manufacturing process. In particular, in an end portion belonging to an internal electrode layer provided near the height of the center of a multilayer body where a pressure is likely to applied in the vertical direction, and being spaced apart from an end surface of the multilayer body, a phenomenon in which the internal electrode layer is finely divided, that is, the so-called beading phenomenon, tends to occur. The finely divided internal electrode layer inhibits the formation of a smooth dielectric layer and thereby impairs the insulating function, which the dielectric layer should originally have. Combined with a high electric field strength, the impaired insulating function may lead to dielectric breakdown of the multilayer ceramic capacitor.

Under the above-described circumstances, there is a demand for the development of a highly reliable multilayer ceramic capacitor that maintains good dielectric characteristics and is free from dielectric breakdown and similar defects even though the multilayer ceramic capacitor is miniaturized by way of thinning the dielectric layers and the internal electrode layers.

SUMMARY OF THE INVENTION

Example embodiments of the present invention provide highly reliable multilayer ceramic capacitors that each maintain good dielectric characteristics and are free from dielectric breakdown and similar defects by preventing or reducing a phenomenon in which an internal electrode layer is finely divided in its end portion spaced apart from an end surface of a multilayer body even though the multilayer ceramic capacitor is miniaturized by way of thinning the dielectric layers and the internal electrode layers.

The present inventors conducted research and have conceived of and developed example embodiments of the present invention based on the following findings. A highly reliable multilayer ceramic capacitor that maintains good dielectric characteristics and is free from dielectric breakdown and similar defects can be obtained by a configuration in which, when viewed as a section of a central portion of the multilayer ceramic capacitor in a width direction cut parallel or substantially parallel to a side surface, in one internal electrode layer provided in a central portion in a lamination direction and including an extremity spaced apart from an end surface, any one of five segments of the one internal electrode layer that are horizontally and successively positioned from the extremity has a length greater than about 0.2 times of an average length of ten segments of the one internal electrode layer that are horizontally and successively positioned in a central portion in a length direction.

Thus, an example embodiment of the present invention provides a multilayer ceramic capacitor including a multilayer body including an inner layer portion that includes a plurality of dielectric layers and a plurality of internal electrode layers laminated alternately with each other, the multilayer body including a pair of main surfaces opposite to each other in a lamination direction, a pair of end surfaces opposite to each other in a length direction perpendicular or substantially perpendicular to the lamination direction, and a pair of side surfaces opposite to each other in a width direction perpendicular or substantially perpendicular to both the lamination direction and the length direction, end surface external electrodes opposite to each other on the end surfaces of the multilayer body, and side surface external electrodes opposite to each other on the side surfaces of the multilayer body, the internal electrode layers including a first internal electrode layer and a second internal electrode layer that are connected to the end surface external electrodes and the side surface external electrodes, respectively, in which when viewed as a section of a central portion of the multilayer ceramic capacitor in the width direction cut parallel or substantially parallel to the side surface: in one internal electrode layer included in the plurality of internal electrode layers in a central portion in the lamination direction and including an extremity spaced apart from the end surface, an average length of ten segments of the one internal electrode layer that are horizontally and successively positioned in a central portion in the length direction is defined as a, and any one of five segments of the one internal electrode layer that are horizontally and successively positioned from the extremity has a length greater than about 0.2a.

An example embodiment of the present invention can provide a highly reliable three-terminal multilayer ceramic capacitor that maintains good dielectric characteristics and is free from dielectric breakdown and similar defects by preventing or reducing a phenomenon in which an internal electrode layer is finely divided in its end portion spaced apart from an end surface of a multilayer body even though the three-terminal multilayer ceramic capacitor is miniaturized by way of thinning the dielectric layers and the internal electrode layers.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
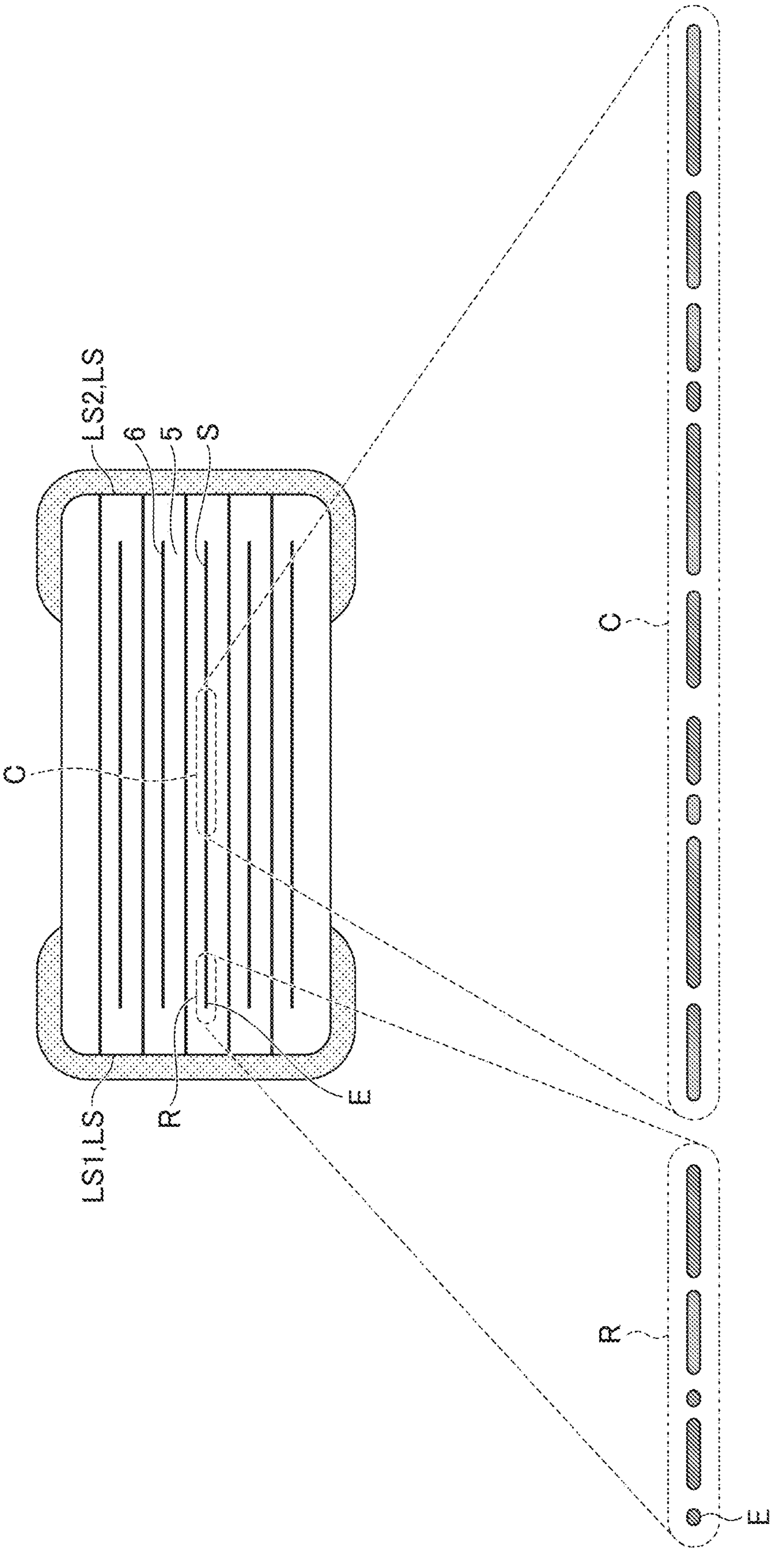
FIG. 1 is a schematic diagram illustrating a multilayer ceramic capacitor of an example embodiment of the present invention.

Example embodiments of multilayer ceramic capacitors of the present invention will be described below, in which a first example embodiment relates to a three-terminal multilayer ceramic capacitor, and a second example embodiment relates to a two-terminal multilayer ceramic capacitor.

It should be noted that each of the example embodiments described below exemplify aspects in which the present invention is worked, and the present invention is not limited to the contents of the example embodiments described below. The drawings may be schematic and simplified in order to illustrate the contents of the invention, and a ratio between the dimensions of an illustrated component and a ratio between the dimensions of illustrated components may be different from ratios of those dimensions described in the specification. Furthermore, components described in the specification may be omitted in the drawings, and not all but portions of pieces of components may be illustrated in the drawings.

First Example Embodiment

Figure 2:
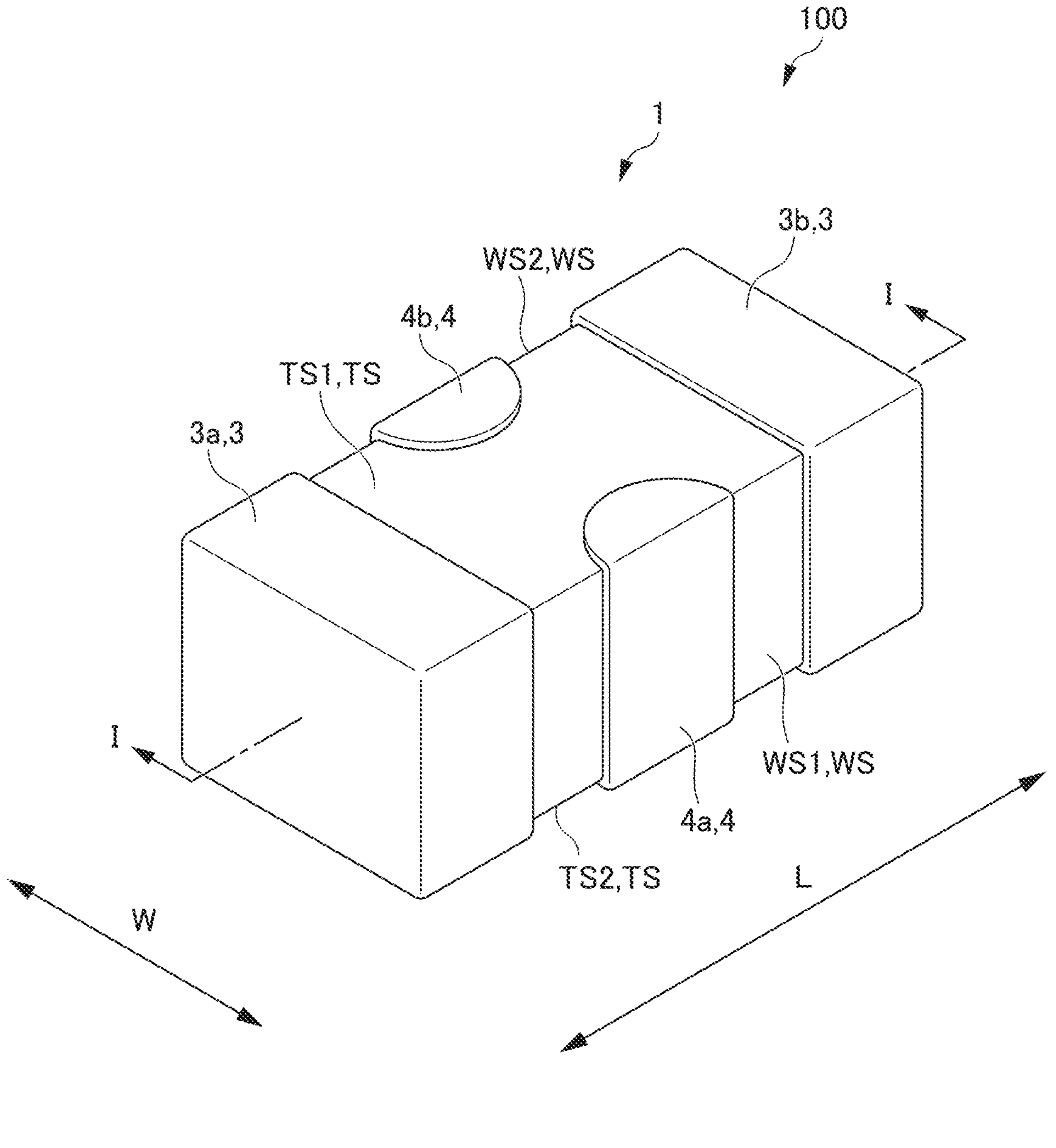
FIG. 2 is an external view of a first example embodiment of the present invention.
Figure 3:
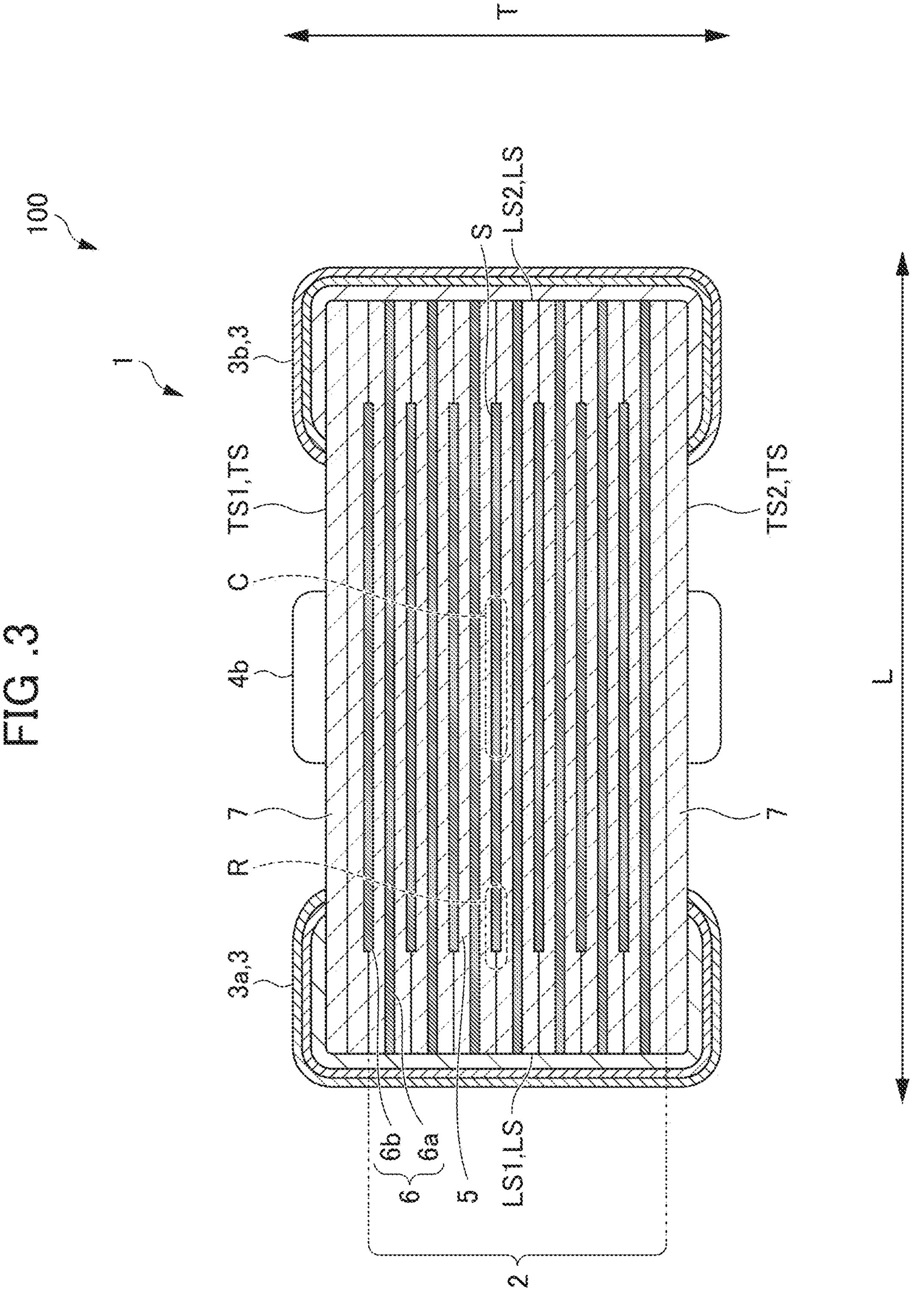
FIG. 3 is a cross-sectional view of the first example embodiment of the present invention.
Figure 4:
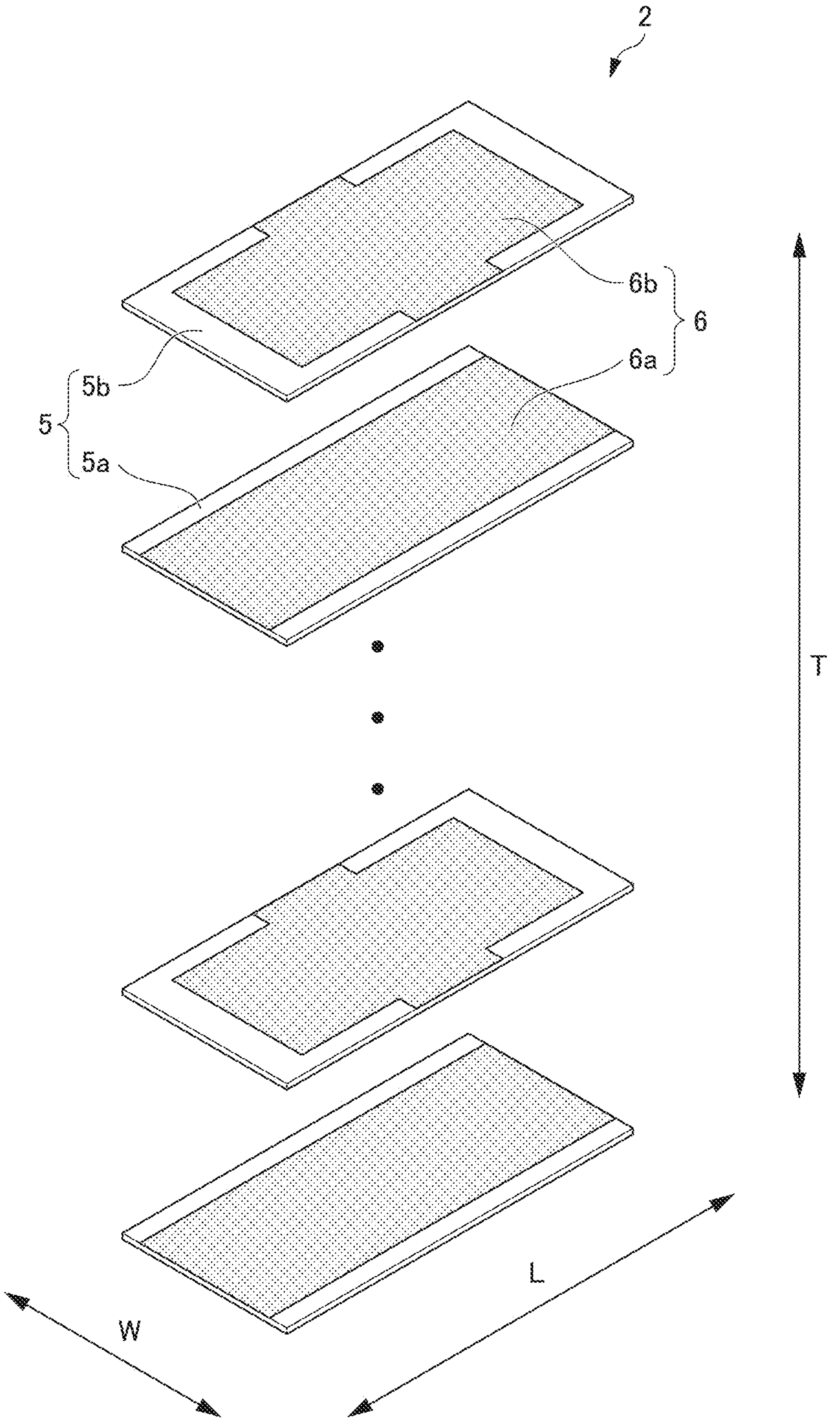
FIG. 4 is a schematic diagram illustrating a structure of an inner layer portion of the first example embodiment of the present invention.

FIGS. 2 to 4 illustrate the shape and structure of a three-terminal multilayer ceramic capacitor 100 as the first example embodiment. FIG. 2 is an external view of the three-terminal multilayer ceramic capacitor 100. FIG. 3 is a cross-sectional view (LT sectional view) of the three-terminal multilayer ceramic capacitor 100 illustrated in FIG. 2, taken along the line I-I in a central portion in the width direction W. FIG. 4 is a schematic diagram illustrating a structure of an inner layer portion. The structure of the multilayer ceramic capacitor 100 will be described by referring to the following directions: a lamination direction T in which dielectric layers and internal electrode layers are laminated, a length direction L perpendicular or substantially perpendicular to the lamination direction T, and a width direction W perpendicular or substantially perpendicular to the lamination direction T and the length direction L. The example embodiments are based on the assumption that the width direction W, the length direction L, and the lamination direction T are perpendicular or substantially perpendicular to each other, but the directions are not necessarily perpendicular or substantially perpendicular to each other and may intersect with each other.

The multilayer ceramic capacitor 100 includes a multilayer body 1 with a rectangular parallel or substantially parallelepiped shape. The multilayer body 1 includes the inner layer portion 2, and has a pair of main surfaces TS1 and TS2 opposite to each other in the lamination direction T, a pair of end surfaces LS1 and LS2 opposite to each other in the length direction L perpendicular or substantially perpendicular to the lamination direction T, and a pair of side surfaces WS1 and WS2 opposite to each other in the width direction W perpendicular or substantially perpendicular to both the lamination direction T and the length direction L.

The dimensions of the multilayer ceramic capacitor 100 are not particularly limited, but, for example, the dimension in the lamination direction T may be about 0.1 mm to about 2.5 mm, the dimension in the length direction L may be about 0.1 mm to about 3.2 mm, and the dimension in the width direction W may be about 0.1 mm to about 2.5 mm.

The multilayer body 1 has, on its surfaces, a first end surface external electrode 3*a*, a second end surface external electrode 3*b*, a first side surface external electrode 4*a*, and a second side surface external electrode 4*b*.

The first end surface external electrode 3*a* is provided on the first end surface LS1 of the multilayer body 1. The first end surface external electrode 3*a* has a cap shape, and includes a peripheral portion extending from the first end surface LS1 onto the first main surface TS1, the second main surface TS2, the first side surface WS1, and the second side surface WS2 of the multilayer body 1.

The second end surface external electrode 3*b* is provided on the second end surface LS2 of the multilayer body 1. The second end surface external electrode 3*b* has a cap shape, and includes a peripheral portion extending from the second end surface LS2 onto the first main surface TS1, the second main surface TS2, the first side surface WS1, and the second side surface WS2 of the multilayer body 1.

The first side surface external electrode 4*a* is provided on the first side surface WS1 of the multilayer body 1. The first side surface external electrode 4*a* has a C shape, and includes end portions extending from the first side surface WS1 onto the first main surface TS1 and the second main surface TS2 of the multilayer body 1.

The second side surface external electrode 4*b* is provided on the second side surface WS2 of the multilayer body 1. The second side surface external electrode 4*b* has a C shape, and includes end portions extending from the second side surface WS2 onto the first main surface TS1 and the second main surface TS2 of the multilayer body 1.

The end surface external electrodes 3 and the side surface external electrodes 4 may each have, for example, a structure including a base electrode layer and a plated layer provided on the base electrode layer.

The base electrode layer contains glass and metal, and may include one layer or a plurality of layers. Examples of the metal include, but are not limited to, metals such as Cu, Ni, Ag, Pd, and Au, and an alloy of Ag and Pd.

The base electrode layer is formed by applying a conductive paste including glass and metal to the multilayer body and firing the applied conductive paste. The firing may be performed at the same time as or after firing of the multilayer body.

The plated layer provided on the base electrode layer includes, for example, at least one selected from metals such as Cu, Ni, Ag, Pd, and Au, and an alloy of Ag and Pd. The plated layer may include one layer or a plurality of layers. The plated layer may include, for example, a two-layer structure including a Ni plated layer and a Sn plated layer.

The inner layer portion 2 includes a plurality of dielectric layers 5 and a plurality of internal electrode layers 6 that are laminated on each other. The internal electrode layers 6 include internal electrode layer 6*a* corresponding to first internal electrode layers, and internal electrode layers 6*b* corresponding to second internal electrode layers.

The dielectric layers 5 may be made of any material. For example, a dielectric ceramic including $BaTiO_3$ as a main component can be used as the material. However, a dielectric ceramic including, instead of $BaTiO_3$, $CaTio_3$, $SrTiO_3$, $CaZro_3$, or the like as a main component may be used.

The thickness of the dielectric layer 5 is not particularly limited, and may be, for example, about 0.3 μm to about 2.0 μm in an effective region for formation of capacitance that are formed by the first internal electrode layers 6*a* and the second internal electrode layers 6*b*.

The number of the dielectric layers 5 is not particularly limited, and may be, for example, 1 to 6000 in the effective region for formation of capacitance that are formed by the first internal electrode layers 6*a* and the second internal electrode layers 6*b*.

The top and the bottom of the inner layer portion 2 are provided with outer layer portions 7 that include only the dielectric layers 5, and do not include the internal electrode layers 6. The thickness of the outer layer portion 7 is not limited, and may be, for example, about 15 μm to about 150 μm. The dielectric layers in the outer layer portions 7 may be thicker than the dielectric layers in the effective region for formation of capacitance, where the internal electrode layers 6 are located. The dielectric layers in the outer layer portions 7 may be made of a different material from the material of the dielectric layers in the inner layer portion 2.

FIG. 4 illustrates the inner layer portion 2 disassembled in the lamination direction T into the dielectric layers 5.

The internal electrode layer 6 is formed by sintering an internal electrode paste including a metal powder serving as a conductor, an additive such as a plasticizer, a dispersant, or the like, and an organic solvent and applied to the dielectric layer 5. The internal electrode layers 6 and the dielectric layers 5 are alternately laminated to form the inner layer portion 2. The internal electrode layers 6 include the first internal electrode layers 6*a* and the second internal electrode layers 6*b*. The first internal electrode layer 6*a* and the second internal electrode layer 6*b* are provided on the dielectric layers 5*a* and 5*b*, respectively.

Each first internal electrode layer 6*a* penetrates through the interior of the multilayer body 1 in the length direction L and is connected to the end surface external electrodes 3. Each first internal electrode layer 6*a* has a shape both ends of which are led out to the end surfaces LS of the multilayer body 1 and connected to the end surface external electrodes 3, but no portion of which is led out to the side surfaces WS of the multilayer body 1 or connected to the side surface external electrodes 4. In the current example embodiment, the first internal electrode layer 6*a* has a rectangular shape as illustrated in FIG. 4, but this is a non-limiting example. Any shape can be adopted provided that the first internal electrode layer 6*a* is connected to the end surface external electrodes 3 and is not connected to the side surface external electrodes 4.

Each second internal electrode layer 6*b* penetrates through the interior of the multilayer body 1 in the width direction W, is connected to the side surface external electrodes 4, and generates electrostatic capacitance between the second internal electrode layer 6*b* and the first internal electrode layers 6*a*. In the current example embodiment, the second internal electrode layer 6*b* has a shape both ends of which are led out to the side surfaces WS of the multilayer body 1 and connected to the side surface external electrodes 4, but no portion of which is led out to the end surfaces LS of the multilayer body 1 or connected to the end surface external electrodes 3. The second internal electrode layer 6*b* may have a substantially cross shape as illustrated in FIG. 4, but this is a non-limiting example. Any shape can be adopted provided that the second internal electrode layer 6*b* is connected to the side surface external electrodes 4 and is not connected to the end surface external electrodes 3.

The internal electrode layers 6 may include Ni as a main component, but may include another metal such as Cu, Ag, Pd, Au, or the like instead of Ni. Alternatively, an alloy of Ni, Cu, Ag, Pd, Au, or the like with another metal may be included.

The thickness of the internal electrode layer 6 is not particularly limited, and may be, for example, about 0.3 μm to about 1.5 μm.

The multilayer ceramic capacitor 100, in which each first internal electrode layer 6*a* is connected to the first end surface external electrode 3*a* and the second end surface external electrode 3*b*, and each second internal electrode layer 6*b* is connected to the first side surface external electrode 4*a* and the second side surface external electrode 4*b*, can be used as a three-terminal capacitor. Specifically, the multilayer ceramic capacitor 100 can be used as a three-terminal capacitor in such a manner that the multilayer ceramic capacitor 100 interrupts a power supply line or a signal line in a circuit, and has the first end surface external electrode 3*a* connected to one of the segments of the interrupted line, the second end surface external electrode 3*b* connected to the other of the sections of the interrupted line, and the first side surface external electrode 4*a* and the second side surface external electrode 4*b* connected to the ground. In this case, the first internal electrode layers 6*a* serve as through electrodes, and the second internal electrode layers 6*b* serve as ground electrodes.

Second Example Embodiment

Figure 5:
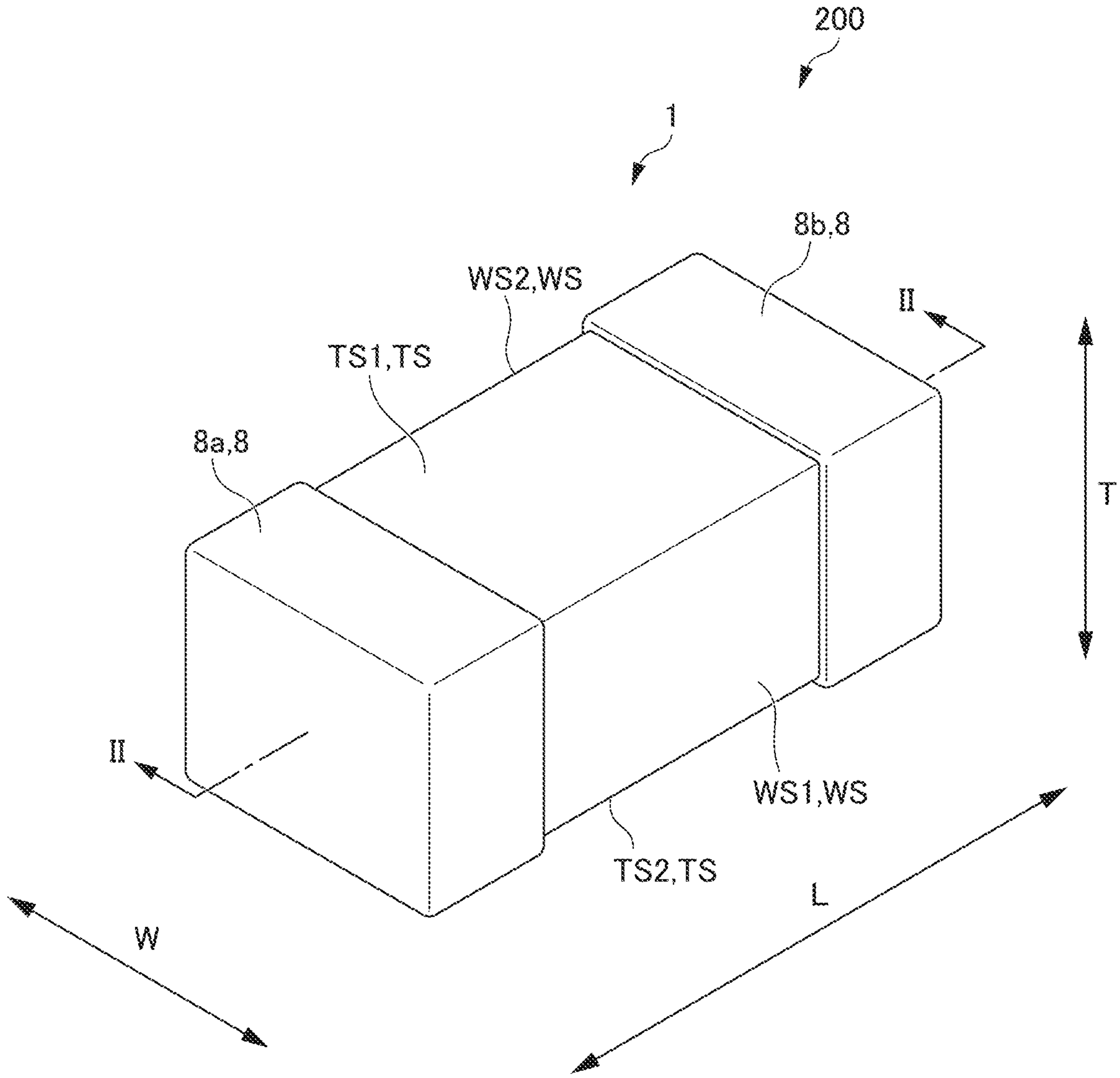
FIG. 5 is an external view of a second example embodiment of the present invention.
Figure 6:
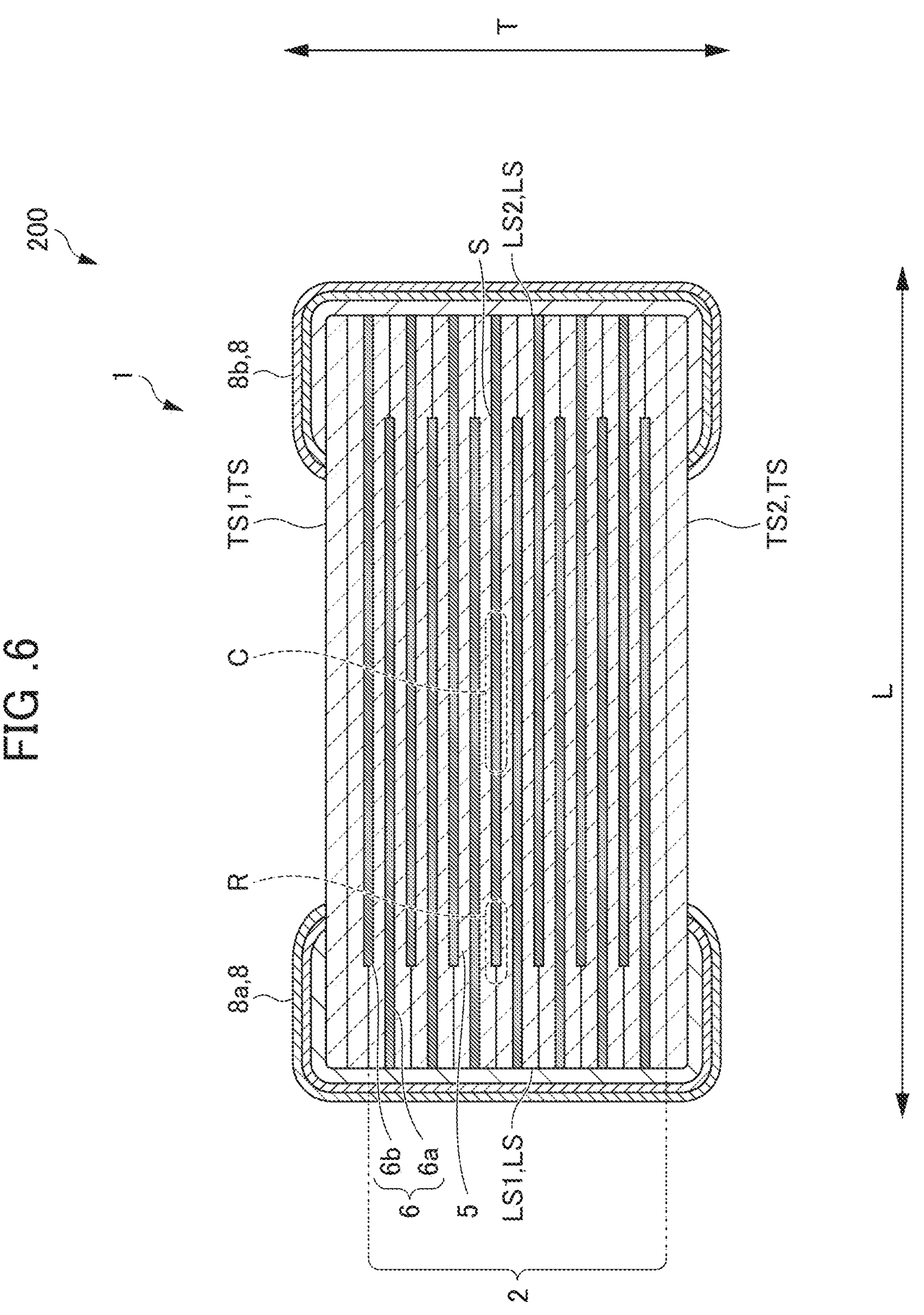
FIG. 6 is a cross-sectional view of a second example embodiment of the present invention.
Figure 7:
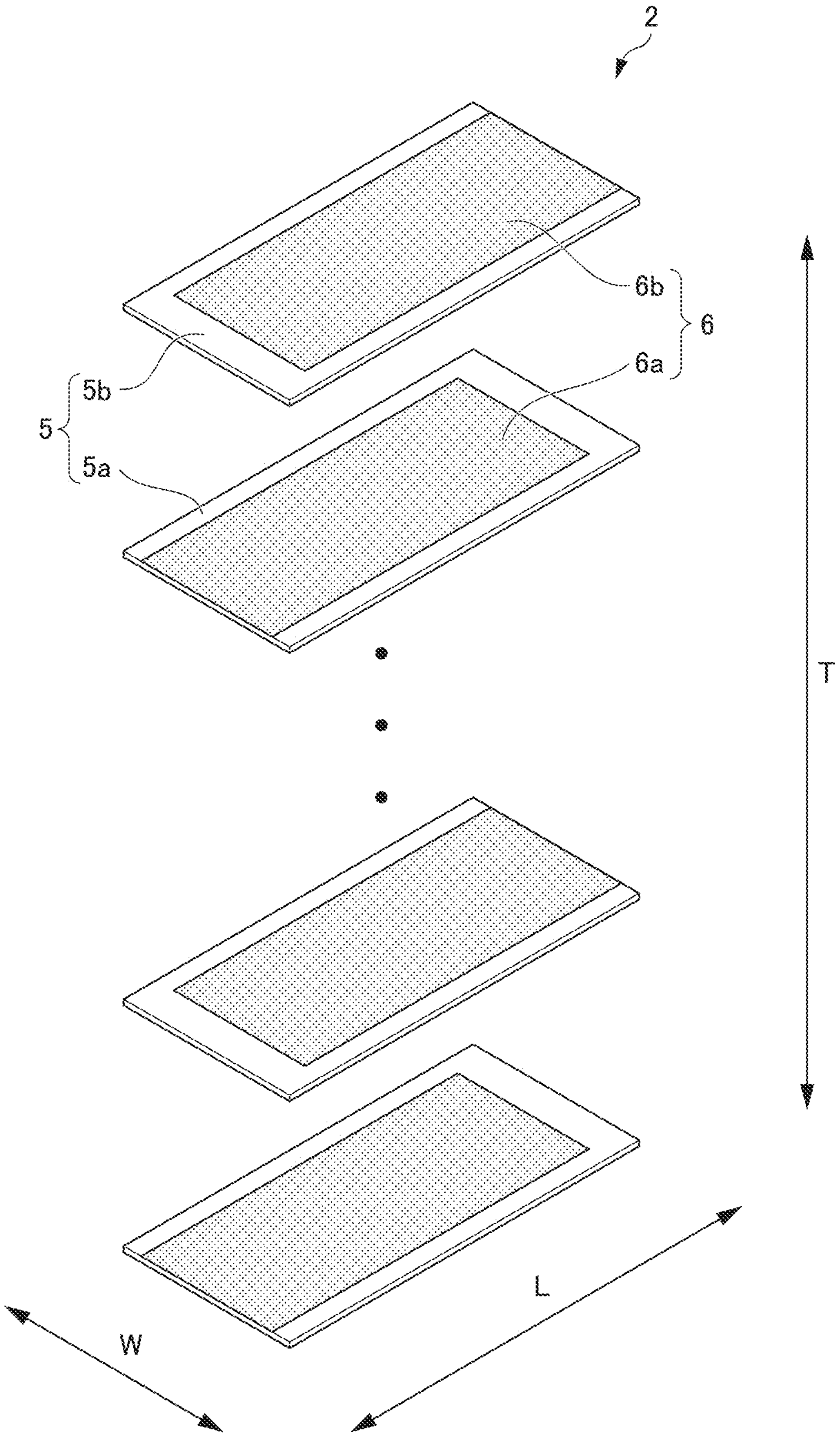
FIG. 7 is a schematic diagram illustrating a structure of an inner layer portion of the second example embodiment of the present invention.

FIGS. 5 to 7 illustrate the shape and structure of a two-terminal multilayer ceramic capacitor 200 as the second example embodiment. FIG. 5 is an external view of the two-terminal multilayer ceramic capacitor 200. FIG. 6 is a cross-sectional view (LT sectional view) of the two-terminal multilayer ceramic capacitor 200 illustrated in FIG. 5, taken along the line II-II in a central portion in the width direction W. FIG. 7 is a schematic diagram illustrating a structure of an inner layer portion.

The two-terminal multilayer ceramic capacitor 200 includes a multilayer body 1 having a rectangular parallel or substantially parallelepiped shape. The multilayer body 1 includes an inner layer portion 2, and has a pair of main surfaces TS1 and TS2 opposite to each other in a lamination direction T, a pair of a first end surface LS1 and a second end surface LS2 opposite to each other in a length direction L perpendicular or substantially perpendicular to the lamination direction T, and a pair of a first side surface WS1 and a second side surface WS2 opposite to each other in a width direction W perpendicular or substantially perpendicular to both the lamination direction T and the length direction L.

The inner layer portion 2 includes a plurality of dielectric layers 5 and a plurality of internal electrode layers 6 laminated on each other. The internal electrode layers 6 includes first internal electrode layers 6*a* and second internal electrode layers 6*b*. The first internal electrode layer 6*a* and the second internal electrode layer 6*b* are provided on the dielectric layers 5*a* and 5*b*, respectively.

Each of the internal electrode layers 6*a* and 6*b* extends in the length direction L and has a rectangular or substantially rectangular shape in plan view. Each first internal electrode layer 6*a* is led out to the first end surface LS1 of the multilayer body 1, and each second internal electrode layer 6*b* is led out to the second end surface LS2 of the multilayer body 1.

The multilayer body 1 has, on its surfaces, a first external electrode 8*a* and a second external electrode 8*b*.

The first external electrode 8*a* is provided on the first end surface LS1 of the multilayer body 1. The first external electrode 8*a* has a cap shape, and includes a peripheral portion extending from the first end surface LS1 onto the main surface TS1, the main surface TS2, the first side surface WS1, and the second side surface WS2 of the multilayer body 1.

The second external electrode 8*b* is provided on the second end surface LS2 of the multilayer body 1. The second external electrode 8*b* has a cap shape, and includes a peripheral portion extending from the second end surface LS2 onto the main surface TS1, the main surface TS2, the first side surface WS1, and the second side surface WS2 of the multilayer body 1.

In the two-terminal multilayer ceramic capacitor 200, each first internal electrode layer 6*a* is led out to the first end surface LS1 of the multilayer body 1 and is connected to the first external electrode 8*a*. Each second internal electrode layer 6*b* is led out to the second end surface LS2 of the multilayer body 1 and is connected to the second external electrode 8*b*.

The dielectric layers, the internal electrode layers, the external electrodes, etc., of the two-terminal multilayer ceramic capacitor may be made of the same materials and have the same structures as those of the three-terminal multilayer ceramic capacitor, or may be made of modified materials and have modified structures.

FIG. 1 is a schematic diagram illustrating a section (LT section) of a central portion of a multilayer ceramic capacitor in the width direction W cut parallel or substantially parallel to side surfaces WS. In the multilayer ceramic capacitor miniaturized by way of thinning the dielectric layers 5 and the internal electrode layers 6, an end portion of the internal electrode layer spaced apart from an end surface LS tends to be divided during the manufacturing process, whereby the smoothness of the dielectric layers is likely to be impaired and dielectric breakdown tends to occur. Here, reference is made to the internal electrode layer S provided in a central portion in the lamination direction T and including an extremity E spaced apart from the end surface LS of the multilayer body. In a central portion in the length direction L, ten segments of the internal electrode layer S are horizontally and successively positioned (ten segments in the central portion C in the figure), and an average length of the ten segments is defined as a. On the other hand, five segments of the internal electrode layer S are horizontally and successively positioned from the extremity E (five segments in an end portion R in the figure). Causing any one of the five segments to have a length greater than about 0.2 times the average length a (about 0.2a), for example, makes it possible to effectively prevent or reduce dielectronic breakdown.

Specific structures and methods to prevent or reduce the division of the internal electrode layer in the end portion R will be described below.

The multilayer ceramic capacitor is fabricated in the following manner. First, green sheets are prepared by applying a ceramic paste for forming dielectric layers in a sheet shape and drying the sheet-shaped ceramic paste, and thereafter, a conductive paste for forming internal electrode layers is applied in predetermined patterns to the green sheets by, for example, a screen printing method or a gravure printing method. Subsequently, the green sheets having the conductive paste applied thereon in the predetermined patterns are stacked on each other in a predetermined order so that internal electrode layers having predetermined shapes are arranged in the lamination direction. The resultant stack is cut into green chips of a predetermined size. The green chips are fired and subjected to a step of attaching external electrodes, etc., thereby fabricating the multilayer ceramic capacitors. In the step of applying the conductive paste to the green sheets, the printing is performed such that the internal electrode layer is thicker in the end portion R than in the central portion C by about 5% or more on each green sheet, whereby the phenomenon in which the internal electrode layer is finely divided in the end portion R can be prevented or reduced.

In particular, in the length direction L of the multilayer ceramic capacitor, the length of a portion in the end portion R where the conductive paste is thickly applied is suitably set to about 3% or more of the length of a region where electric charge is retained by the internal electrode layers that are vertically opposite to each other, i.e., the so-called effective region.

Examples of the method of thickly applying the conductive paste in the end portion R are as follows. A printing plate for applying the conductive plate in the end portion R and a printing plate for applying the conductive plate in the central portion C are separately provided, and the conductive paste is applied using the printing plate suitable for the end portion R, thereby thickly applying the conductive plate in the end portion R. In the case of using gravure printing or the like, the conductive paste can be thickly applied in the end portion R by using different printing patterns for the end portion R and the central portion C.

The method for preventing or reducing the division of the internal electrode layer in the end portion R further includes oxidizing the green chips. By oxidizing the green chips before firing, the melting point of the internal electrode layer is raised, thereby making it possible to reduce or prevent shrinkage of the internal electrode layer that can be caused during the firing. As a result, the division of the internal electrode layer in the end portion that can be caused by shrinkage of the internal electrode layer can be prevented or reduced. For example, when heating is performed in a predetermined atmosphere so that a degree of oxidation of Ni contained in the internal electrode layer reaches about 0.5% or higher in the central portion C, and about 1.0% or higher in the end portion R, a significant effect can be obtained, for example.

The method for preventing or reducing the division of the internal electrode layer in the end portion R further includes adjusting the particle diameter of a metal component contained in the internal electrode layer. Using an inner electrode layer including a metal component with a large particle diameter in the end portion R makes it possible to prevent or reduce the division of the internal electrode layer in the end portion R. For example, reference is made to particle diameters of Ni contained in the internal electrode layer. When the particle diameter in the end portion R is larger by about 0.5% than the particle diameter in the central portion C, the division of the internal electrode layer in the end portion R can be effectively prevented or reduced.

Reliability Evaluation

A high-temperature load test was performed to evaluate the reliability of multilayer ceramic capacitors. In an example of the high-temperature load test, a voltage of 100 V was applied to the samples at a temperature of 150° C. for 1000 hours, and thereafter, insulation resistance was measured. Based on the measurement results, a sample having an insulation resistance value of less than $10^{7.5}\Omega$ was identified as an insulation failure. Next, the samples subjected to the test were cut in a central portion in the width direction W, and the lengths of ten segments in the central portion C of an internal electrode layer S provided in a central portion in the lamination direction T as shown in FIG. 1 were measured to obtain an average length a. The samples were classified according to the number of segments longer than about 0.2 times the average length a (about 0.2a), among five segments of the internal electrode layer in the end portion R. Table 1 shows a relationship between the number of segments of the internal electrode layer longer than about 0.2 times the average length a (about 0.2a) and the number of samples identified as an insulation failure in the high-temperature load test. The lengths of the segments of the internal electrode layers were measured using a scanning electron microscope.

TABLE 1

| Number of segments having a length greater than 0. 2a(*1), among the five segments of the internal electrode layer in the end portion R | | Ratio of failed samples |
|---|---|---|
| 0 pieces | N = 72 | 72/72 |
| 1 piece | N = 72 | 0/72 |
| 4 pieces | N = 72 | 0/72 |

(*1)“a” represents the average length of ten segments of the internal electrode layer in central portion C.

The results shown in Table 1 demonstrate the following. For the internal electrode layer S provided in a central portion in the lamination direction T and including an extremity E spaced apart from an end surface of the multilayer body, an average length of ten segments of the internal electrode layer S that are horizontally and successively positioned in a central portion in the length direction L (ten segments in the central portion C) is defined as a. In a case where among five segments of the internal electrode layer S that are horizontally and successively positioned from the extremity E (five segments in the end portion R), one or more segments are longer than about 0.2a, the insulation resistance does not decrease under the test conditions.

The phenomenon in which an internal electrode layer is finely divided in an end portion spaced apart from an end surface of a multilayer body tends to occur in an end portion belonging to an internal electrode layer that extends in a central portion of a multilayer body in the width direction W where a pressure is vertically applied and that is provided in a central portion in the lamination direction T.

Therefore, the central portion of the multilayer ceramic capacitor in the width direction W at which the multilayer ceramic capacitor is cut is preferably within the range of about ⅖ to about ⅗ of the entire width of the multilayer ceramic capacitor, for example.

Relative to the internal electrode layer S provided in the central portion in the lamination direction T and having the extremity E spaced apart from an external electrode, it is preferable that the difference between the number of internal electrode layers above the internal electrode layer S and the number of internal electrode layers below the internal electrode layer S is 0 or more and 2 or less, for example.

Regarding the ten segments of an internal electrode layer successively positioned in the central portion in the length direction L, a region in which relatively long segments are arranged should be chosen from the internal electrode layer, and it is preferable to set the region to be within the range of about ¼ to about ¾ of the entire length of the multilayer ceramic capacitor, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including an inner layer portion that includes a plurality of dielectric layers and a plurality of internal electrode layers laminated alternately with each other, the multilayer body including a pair of main surfaces opposite to each other in a lamination direction, a pair of end surfaces opposite to each other in a length direction perpendicular or substantially perpendicular to the lamination direction, and a pair of side surfaces opposite to each other in a width direction perpendicular or substantially perpendicular to both the lamination direction and the length direction;

end surface external electrodes opposite to each other on the end surfaces of the multilayer body; and side surface external electrodes opposite to each other on the side surfaces of the multilayer body;

the internal electrode layers including a first internal electrode layer and a second internal electrode layer that are connected to the end surface external electrodes and the side surface external electrodes, respectively; wherein when viewed as a section of a central portion of the multilayer ceramic capacitor in the width direction cut parallel or substantially parallel to the side surface:

in one internal electrode layer included in the plurality of internal electrode layers in a central portion in the lamination direction and including an extremity spaced apart from the pair of end surfaces, an average length of ten segments of the one internal electrode layer that are horizontally and successively positioned in a central portion in the length direction is defined as a, and any one of five segments of the one internal electrode layer that are horizontally and successively positioned from the extremity has a length greater than about 0.2a.

2. The multilayer ceramic capacitor according to claim 1, wherein the central portion of the multilayer ceramic capacitor in the width direction is within a range of about ⅖ to about ⅗ of an entire width of the multilayer ceramic capacitor.

3. The multilayer ceramic capacitor according to claim 1, wherein relative to the one internal electrode layer included in the plurality of internal electrode layers in the central portion in the lamination direction and including the extremity spaced apart from the pair of end surfaces, a difference in number between the internal electrode layers above the one internal electrode layer and the internal electrode layers below the one internal electrode layer is 0 or more and 2 or less.

4. The multilayer ceramic capacitor according to claim 1, wherein the central portion of the multilayer ceramic capacitor in the length direction is within a range of about ¼ to about ¾ of an entire length of the multilayer ceramic capacitor.

5. The multilayer ceramic capacitor according to claim 1, wherein the multilayer ceramic capacitor is a three terminal capacitor.

6. The multilayer ceramic capacitor according to claim 1, wherein the multilayer body has a with a rectangular parallel or substantially parallelepiped shape.

7. The multilayer ceramic capacitor according to claim 1, wherein the internal electrode layers include Ni, Cu, Ag, Pd, or Au.

8. The multilayer ceramic capacitor according to claim 1, wherein a thickness of each of the internal electrodes is about 0.3 μm to about 1.5 μm.

9. The multilayer ceramic capacitor according to claim 1, wherein the first internal electrode is a through electrode and the second internal electrode is a ground electrode.

10. A multilayer ceramic capacitor comprising:

a multilayer body including an inner layer portion that includes a plurality of dielectric layers and a plurality of internal electrode layers laminated alternately with each other, the multilayer body including a pair of main surfaces opposite to each other in a lamination direction, a pair of end surfaces opposite to each other in a length direction perpendicular or substantially perpendicular to the lamination direction, and a pair of side surfaces opposite to each other in a width direction perpendicular or substantially perpendicular to both the lamination direction and the length direction; and a first external electrode and a second external electrode provided opposite to each other on the end surfaces of the multilayer body;

the internal electrode layers including a first internal electrode layer and a second internal electrode layer that are connected to the first external electrode and the second external electrode, respectively; wherein when viewed as a section of a central portion of the multilayer ceramic capacitor in the width direction cut parallel or substantially parallel to the side surface:

in one internal electrode layer included in the plurality of internal electrode layers in a central portion in the lamination direction and including an extremity spaced apart from the pair of end surfaces, an average length of ten segments of the one internal electrode layer that are horizontally and successively positioned in a central portion in the length direction is defined as a, and any one of five segments of the one internal electrode layer that are horizontally and successively positioned from the extremity has a length greater than about 0.2a.

11. The multilayer ceramic capacitor according to claim 10, wherein the central portion of the multilayer ceramic capacitor in the width direction is within a range of about ⅖ to about ⅗ of an entire width of the multilayer ceramic capacitor.

12. The multilayer ceramic capacitor according to claim 10, wherein relative to the one internal electrode layer included in the plurality of internal electrode layers in the central portion in the lamination direction and including the extremity spaced apart from the pair of end surfaces, a difference in number between the internal electrode layers above the one internal electrode layer and the internal electrode layers below the one internal electrode layer is 0 or more and 2 or less.

13. The multilayer ceramic capacitor according to claim 10, wherein the central portion of the multilayer ceramic capacitor in the length direction is within a range of about ¼ to about ¾ of an entire length of the multilayer ceramic capacitor.

14. The multilayer ceramic capacitor according to claim 10, wherein the multilayer ceramic capacitor is a two terminal capacitor.

15. The multilayer ceramic capacitor according to claim 10, wherein the multilayer body has a with a rectangular parallel or substantially parallelepiped shape.

16. The multilayer ceramic capacitor according to claim 10, wherein the internal electrode layers include Ni, Cu, Ag, Pd, or Au.

17. The multilayer ceramic capacitor according to claim 10, wherein a thickness of each of the internal electrodes is about 0.3 μm to about 1.5 μm.

18. The multilayer ceramic capacitor according to claim 10, wherein the first internal electrode is a through electrode and the second internal electrode is a ground electrode.

* * * * *